Oct. 23, 1934.  T. ROBINSON  1,977,955
MIXING AND REDUCING APPARATUS
Filed April 2, 1930   3 Sheets-Sheet 2
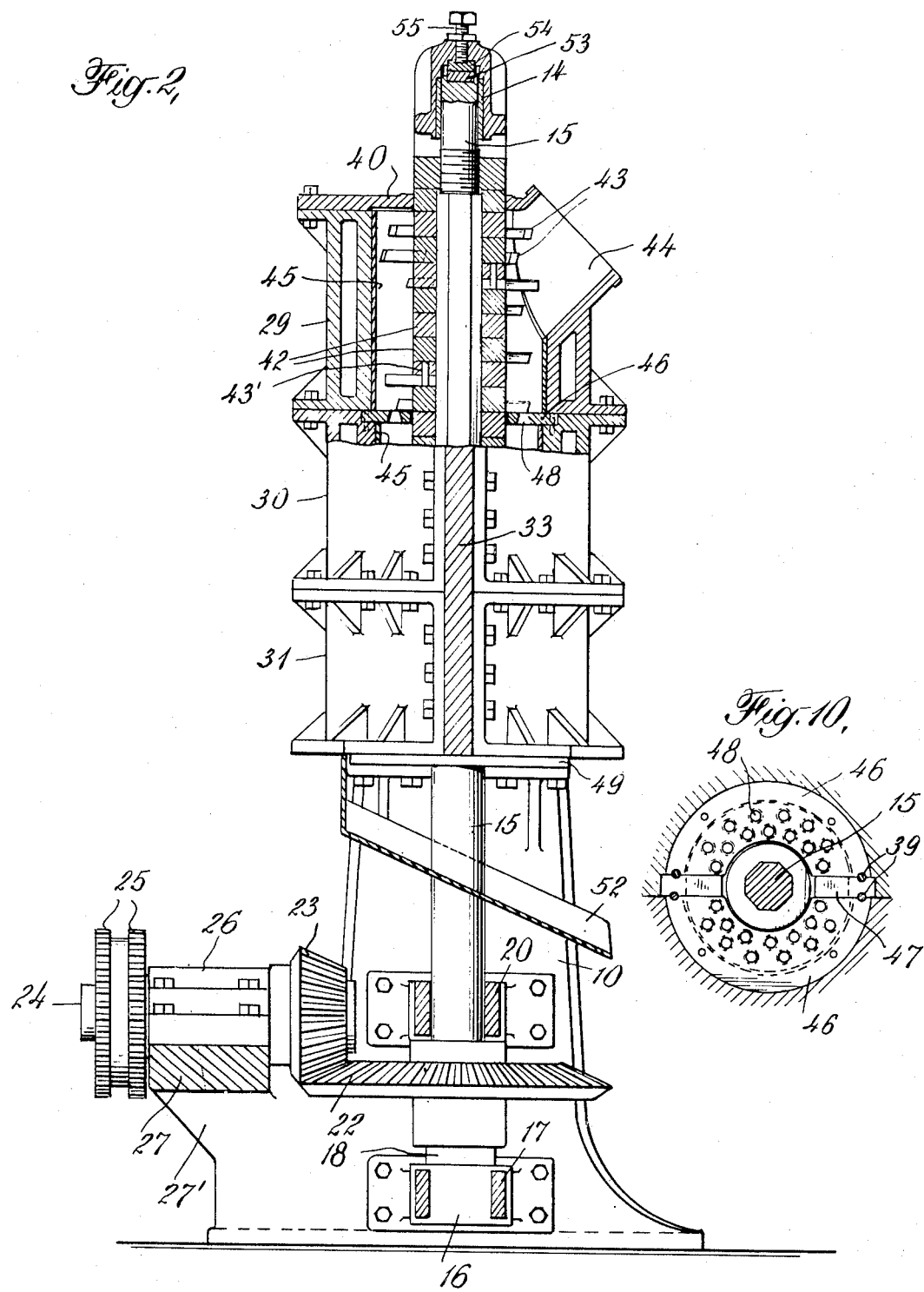

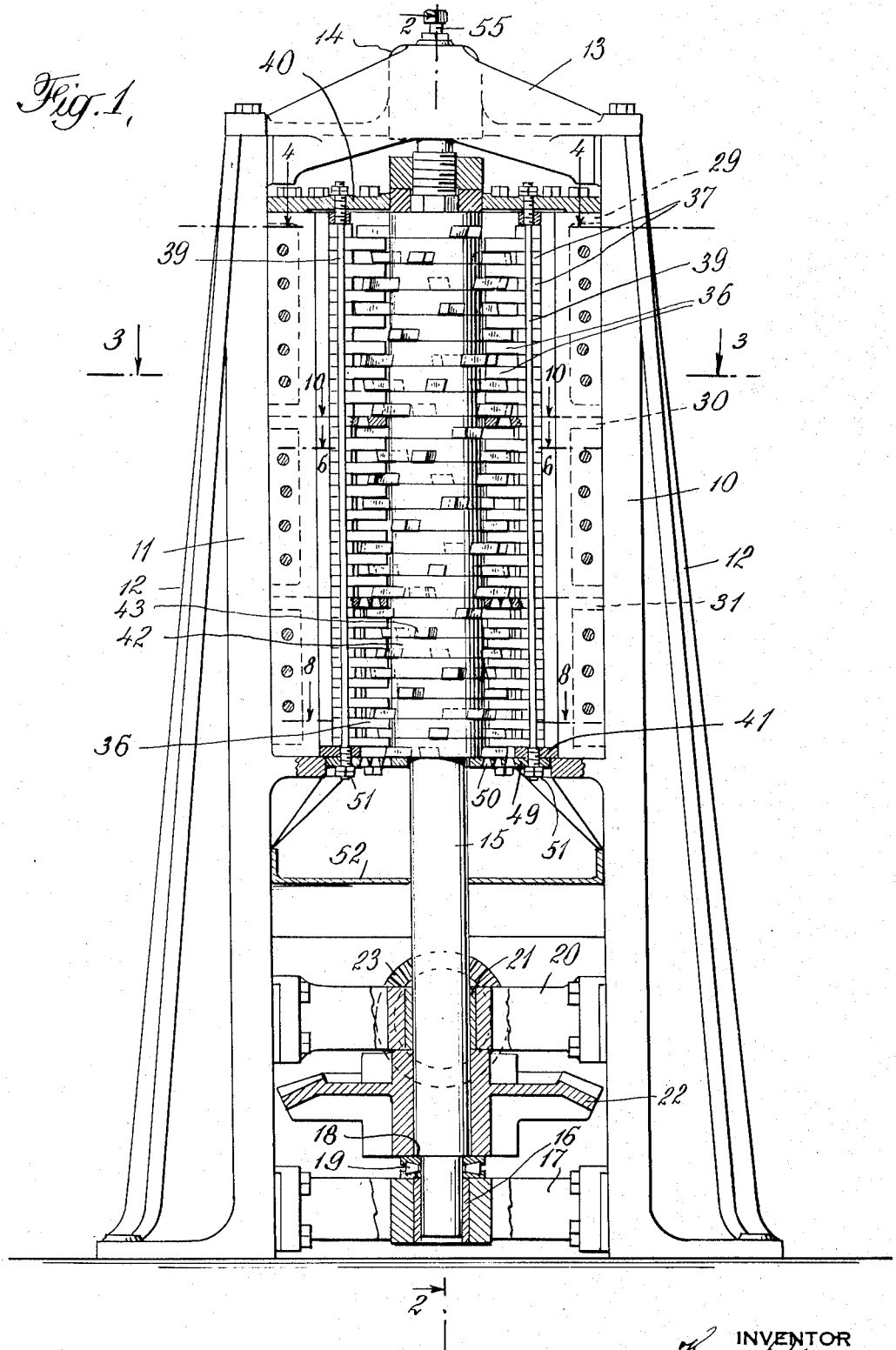

Oct. 23, 1934.                T. ROBINSON                1,977,955
                        MIXING AND REDUCING APPARATUS
                    Filed April 2, 1930           3 Sheets-Sheet 3
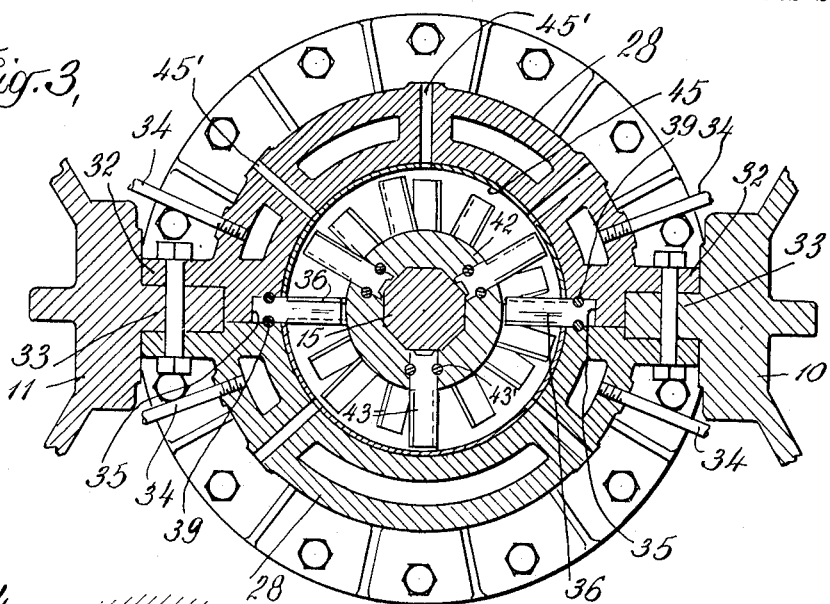
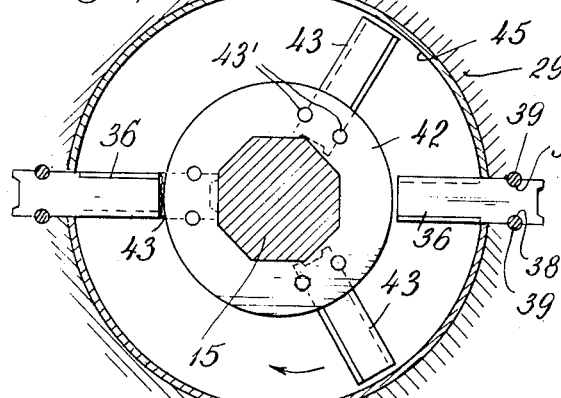
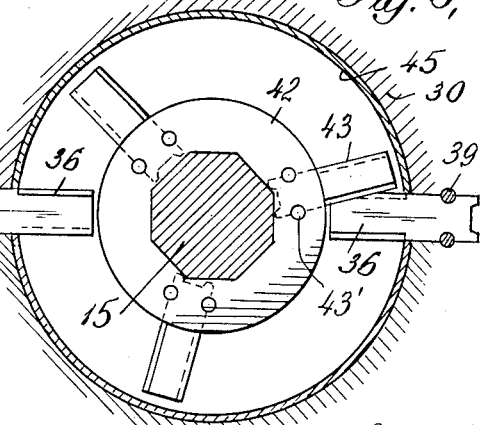
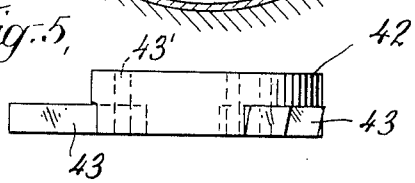
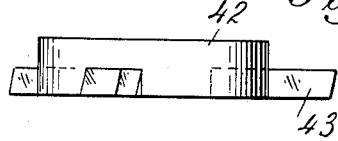
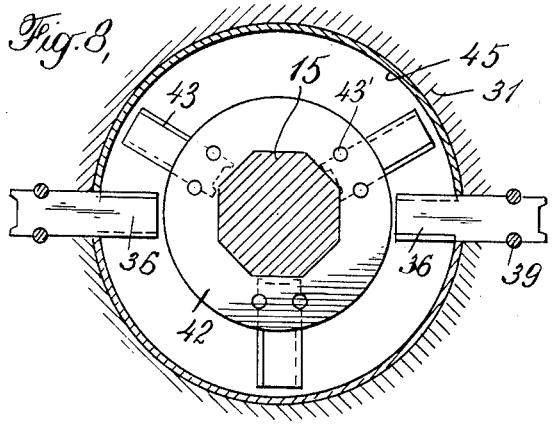
INVENTOR
Thomas Robinson
BY
ATTORNEYS Patented Oct. 23, 1934

1,977,955

UNITED STATES PATENT OFFICE 1,977,955

MIXING AND REDUCING APPARATUS

Thomas Robinson, Goldenbridge, N. Y., assignor to Lancaster Asphalt, Inc., New York, N. Y., a corporation of Delaware Application April 2, 1930, Serial No. 441,043

4 Claims. (Cl. 83—6)

This invention relates to an apparatus for mixing and reducing purposes and is concerned more particularly with a machine by which hardened plastic materials may be reduced to a soft plastic mass which may be molded and shaped to desired form. The machine of this invention is particularly useful in the recovery and utilization of waste products of the asphalt roofing industry and an embodiment of the principles of the invention adapted for that particular purpose will be described in detail, though it is to be understood that the utility of the invention is not limited to that specific use.

In the manufacture of prepared roofing consisting of felt saturated and coated with asphalt and then provided with a surface of grit, substantial amounts of waste are produced either incident to the cutting of shingle units from the felt or as a result of imperfect manufacturing operations. This waste material in the average roofing factory represents a substantial loss of felt, asphalt and grit and numerous attempts have been made to dispose of it by converting it into a form in which it can be employed for useful purposes. Serious obstacles are encountered in treating or converting the material due to the fact that the felt, asphalt, and grit present produce a combination which can be cut up only with the greatest difficulty and ordinary grinding or reducing mills are quite useless for the purpose because the operating elements become coated and gummed with asphalt and dulled by the grit. As a result, it has been common practice to throw the material away and so far as I am aware there was no method or apparatus available prior to the development of the method disclosed in my Patent No. 1,732,281, October 22, 1929, by which this material could be changed into a useful form.

In my prior patent, I have disclosed a method by which the material may be readily reduced to a plastic condition and mixed with other ingredients to form a plastic mass of desired characteristics which is suitable for molding into roofing elements and other products of that sort. The present invention is concerned with a machine for carrying out my patented method, this machine being arranged for the practice of the steps of the method for the production of plastic masses at a high output rate and with relatively low power input.

The new machine includes an operating cylinder or barrel preferably disposed vertically and of diminishing interior capacity from one end to the other. The material to be treated is introduced into the barrel near its upper end and in the barrel are means by which the material is subjected to a succession of shearing operations and advanced through the barrel in the direction of diminishing capacity thereof. The shearing devices employed take the form of sets of knives disposed on a rotary shaft and cooperating with stationary knives, the moving elements being arranged in staggered relation and having operating faces which tend to force the material lengthwise of the barrel during the shearing action. In order to promote the mixing operations, the barrel contains extrusion plates dividing the barrel into sections in end to end alignment. These plates are provided with orifices through which the material is forced as it advances lengthwise of the barrel. At the discharge end of the barrel there are similar extrusion plates and the material is discharged in the form of relatively fine streams. The material is thoroughly agitated and mixed during its passage through the barrel and the shearing operations to which it is subjected reduce it to a plastic condition. This conversion of the material is promoted by heat generated by the shearing operations, the walls of the barrel being relatively thick so that sufficient heat may be retained to insure that the hardened plastic ingredient of the material will be softened.

For a better understanding of the invention, reference may be had to the accompanying drawings in which Fig. 1 is a view in side elevation and partly in section of the complete machine;

Fig. 2 is a partial section on the line 2—2 of Fig. 1;

Figs. 3, 4, 6, 8, and 10 are sectional views on the lines 3—3, 4—4, 6—6, 8—8, and 10—10, respectively, of Fig. 1; and Figs. 5, 7, and 9 are views in side elevation of parts of the apparatus.

Referring now to the drawings, the machine is illustrated as consisting of a pair of upright standards 10 and 11 which are provided with brace members 12. Mounted across the tops of the standards is a cross head 13 in which is disposed a bearing 14 for the upper end of a shaft 15. The lower end of the shaft is received in a radial bearing 16 in a cross bar 17 connecting the lower ends of the standards and the shaft has a shoulder, as indicated at 18, and rests on the shoulder on top of a roller bearing generally designated 19 and supported on top of cross-bar 17. The shaft passes through a cross-bar 20 extending between the standards, in which cross-bar is a bearing 21. Below the cross-bar 20 the shaft carries a gear 22 which meshes with a pinion 23 on a shaft 24 provided with driving gears 25, the shaft 24 being mounted in a bearing 26 on a cross-bar 27 supported on extensions 27' from the standards 10 and 11.

The shaft 15 extends through an operating cylinder or barrel made up of semi-cylindrical members 28. The barrel is formed in three sections 29, 30, and 31 disposed one above the other and each section is made up of a pair of members 28, these members having flanges 32 which are bolted to opposite sides of flanges 33 on the standards 10 and 11. The members 28 are of double wall construction and are provided with water supply pipes 34 to provide for circulation of water through the space between the walls of the members.

One of the members 28 of each section is provided with recesses 35 in its end faces and inserted in these recesses are knives 36. The knives 36 are arranged in two rows diametrically opposite and the knives of each row are spaced apart by spacing blocks 37. The knives and spacing blocks are provided in their lateral edges near one end with semi-cylindrical channels and there is a similar channel formed in the wall of the recess in which the knife and block are received, and another channel in the face of the other member 28 of the section. The channels in the sides of the knives and blocks cooperate with the channels in members 28 to form a pair of round bores. After the knives and blocks are seated in their recesses 38 rods 39 are passed through the bores and serve to lock the knives 36 and blocks against displacement.

The top of the barrel is closed by a top plate 40 secured to the upper end of section 29 and there is a similar plate 41 at the lower end of section 31. The rods 39 are anchored in these plates as illustrated in Fig. 1.

That portion of the shaft 15 which lies within the barrel is made octagonal and on this portion of the shaft are mounted rings 42, each ring having a plurality of channels in one flat face in which are received the ends of knife blades 43. Each knife is provided in its opposite edges with half-round channels or grooves which cooperate with similar channels or grooves formed in the walls of the recess in which the knife is received. Inserted in the bores so formed are pins 43' which lock the knives in place in the recesses in the rings. The knives are of less thickness than the rings, as shown in Fig. 9 and the lateral faces of the knives are inclined so that the ends of the knives are not rectangular.

In each section of the barrel, the shaft carries a plurality of rings 42 so arranged that the knives 43 thereon lie at one side of the stationary knives 36 projecting inwardly into the interior of the section. The knives on the shaft cooperate with the stationary knives to provide a shearing action and each ring has three knives so that there are six shearing operations for each ring during one complete rotation of the shaft. The knives on successive rings within a section of the barrel are angularly offset to a slight extent so that the shearing operations do not occur all at the same time during the rotation of the shaft.

The succeeding sections down the barrel are of increased wall thickness so that their inner diameter decreases and the stationary and moving knives and the rings 42 in the succeeding sections are also of decreasing thickness. Also, the rotary knives and the projecting portions of the stationary knives in the succeeding sections down the barrel are of decreasing length. The material which is introduced into the top section through the intake 44 is gradually condensed by reason of the decreasing capacity of the barrel toward its lower end.

Each member 28 forming half of a section is provided with a liner 45. Each liner is of semi-cylindrical form and it extends from the edge of the row of stationary knives at one end of its member 28 around that member to the edge of the other row of knives. Openings 45' are formed in the walls of members 28 for the reception of means for holding the liner members in position.

In the upper wall of each of the elements 28 forming sections 30 and 31, there is a circumferential channel in which is mounted an extrusion plate 46. Each plate is of semi-circular shape and the pairs of plates between sections 29 and 30 and between sections 30 and 31 are spaced by blocks 47 similar to stationary knives and mounted in the knife recesses in members 28. Each plate 46 has openings 48 therethrough forming extrusion orifices for the passage of material being operated on. At the lower end of section 31 there are extrusion plates 49 having three rows of openings 50. These plates are held in position by the rods 39 so that by removal of the nuts 51 at the lower ends of the rods, the plates can be removed and others substituted. Below the lower end of the barrel is a chute 52 having an inclined face upon which the material is discharged from the lower end of the barrel, the material passing down the chute to be discharged into a receptacle at one side of the machine.

In the operation of the machine, the material to be operated on is broken up into pieces of relatively small size and introduced in appropriate quantities into the machine through the intake opening 44. As the machine operates the material is sheared between the rotary and stationary knives and the material tends to move downwardly in part by gravity and in part by the action of the inclined cooperating faces of the knives. Also, as the knives rotate, they agitate the material so that the latter is rendered plastic and thoroughly mixed. When the material accumulates on the extrusion plates 49 beneath the upper section 29, the knives of the lower ring within that section move over the top of the plates and force the material through the openings therein and the fine streams of material thus produced pass into the next section 30 which is of smaller diameter. The knives in this section subject the material to a succession of shearing and agitating operations and the material is compacted due to the smaller space afforded for it. The material eventually reaches the extrusion plates at the bottom of section 30 and is forced therethrough by the action of the knives into the lowest section 31 which is of smallest diameter. Here again, shearing and agitating operations take place and the material is eventually discharged from the machine through the bottom extrusion plates 49. The material passes down the chute 52 into a suitable receptacle.

The shaft 15 is supported on the roller bearing 19 and it has an upward reaction during operation. The upper end of the shaft carries a bearing plate 53 which contacts with a similar plate 54 mounted in the cross head 13 at the top of the opening in which the end of the shaft is received. An adjustment screw 55 mounted in the top of the cross head bears against the plate 54 and provides a means for adjusting the shaft so that the knives thereon will have the proper shearing action in cooperation with the stationary knives mounted in the walls of the barrel.

This machine is suitable for reducing waste products of the roofing industry and I have also found it suitable for producing plastic mixtures including such ingredients as asphalt and filling materials, such as straw, ground cork, and the like. The material is soft and plastic upon discharge and relatively warm so that it is in condition for immediate use in molding operations.

I claim:

1. Apparatus for mixing and reducing purposes which comprises a barrel having inlet and outlet ends and made up of a series of pairs of semi-cylindrical members connected together at their edges to form a plurality of interconnected sections, at least one of the sections having a smaller inner diameter than the immediately preceding section in the direction toward the barrel inlet, stationary knives mounted between the edges of said members and extending inwardly into the barrel, a shaft extending lengthwise of the barrel and knives on the shaft having shearing cooperation with the stationary knives, and means engaging the knife edges for concurrently locking all of the said knives in operative position on the shaft, the set of knives within a section of the barrel remote from the barrel outlet being of greater thickness than those in a section nearer the said outlet.

2. Mixing and reducing apparatus which comprises a generally cylindrical barrel having inlet and outlet ends and composed of longitudinally-aligned sections, at least one thereof having a smaller inner diameter than the immediately preceding section in the direction toward the barrel inlet, extrusion plates respectively mounted within the barrel between the said sections and adjacent the barrel outlet, stationary knives mounted in the barrel walls and extending inwardly therefrom, a shaft extending longitudinally within the barrel, and knives carried by the said shaft and having shearing cooperation with the stationary knives, the knives within each section being shorter than those within the next preceding section in the direction toward the barrel outlet.

3. Mixing and reducing apparatus comprising a casing having inlet and outlet ends and composed of a plurality of longitudinally-aligned sections, at least one thereof having a smaller inner diameter than the immediately preceding section in the direction of the casing inlet, sectional extrusion plates mounted within the casing between the respective sections, a plurality of knives rotatably-mounted in each of the said sections, a plurality of stationary knives in each section and adapted to cooperate with the rotatably-mounted knives for subjecting material in the said sections to a succession of shearing operations and for mixing and gradually compacting the material and advancing it therethrough, the said knives in at least one section being shorter than those in the immediately preceding section, and means for concurrently locking in operative position the said knives and extrusion plates.

4. Apparatus for mixing and reducing purposes, which comprises a generally cylindrical stationary barrel of gradually decreasing internal diameter from one end to the other and having relatively thick heat retaining walls, an intake for admitting material to be acted upon into the end of the barrel of greater internal diameter, a plurality of stationary knives mounted in spaced relation throughout substantially the full length of the barrel walls and extending inwardly, a rotatable shaft extending lengthwise within the barrel, knives mounted radially on the shaft in cooperative shearing relation with said stationary knives having operating faces inclined so as to force material toward the outlet end of the barrel while agitating and shearing the same, and means for adjusting the position of the shaft and the knives carried thereby lengthwise of the barrel.

THOMAS ROBINSON.